Figure 1:
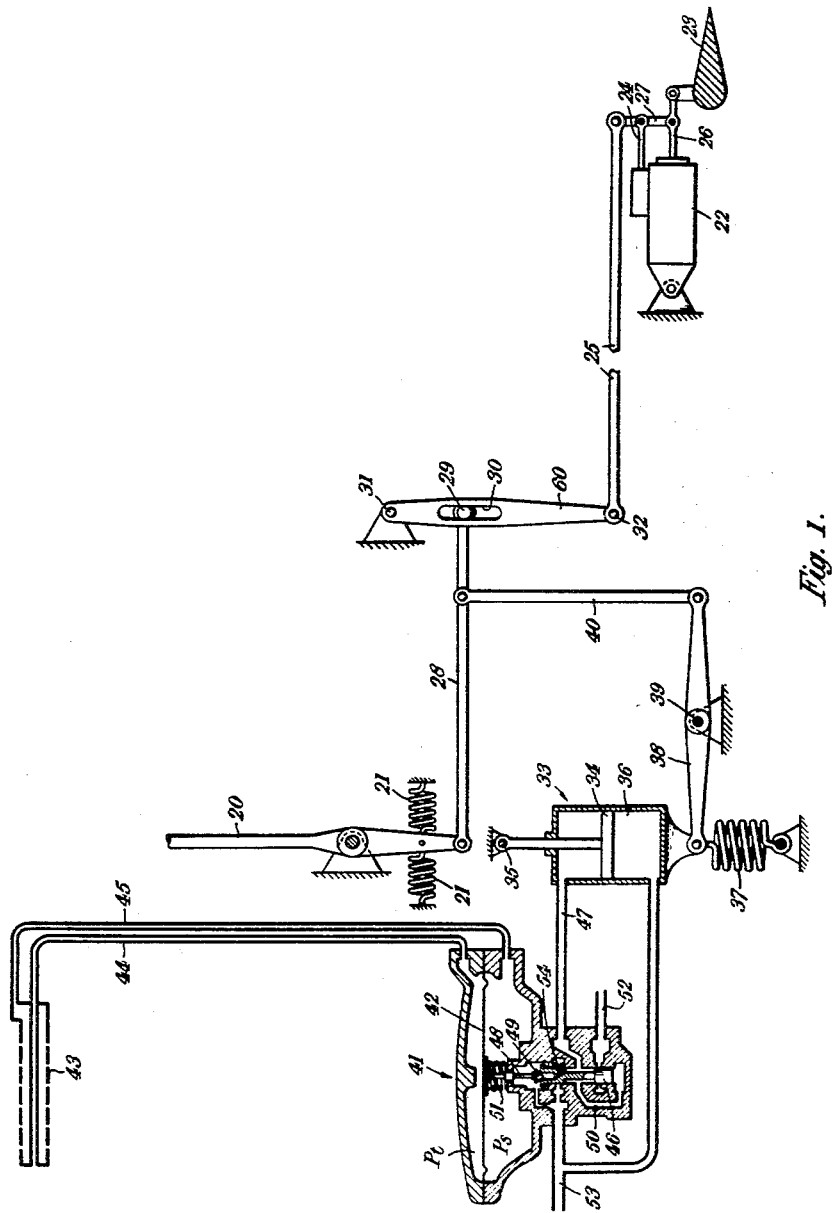

May 3, 1960   R. WESTBURY ET AL   2,935,276
AIRCRAFT CONTROL SYSTEM

Filed May 25, 1955                   3 Sheets-Sheet 1

United States Patent Office 2,935,276
Patented May 3, 1960

2,935,276

AIRCRAFT CONTROL SYSTEM

Roy Westbury, Bridgnorth, Salop, England, and Charles Philip Smith, Ramsay, Isle of Man, assignors to H. M. Hobson Limited, London, England, a British company Application May 25, 1955, Serial No. 510,931

Claims priority, application Great Britain June 3, 1954

4 Claims. (Cl. 244—83)

Due to the wide speed range of modern high speed aircraft, the aerodynamic control surfaces become extremely powerful at the high speed end of the range. In a typical case, the elevator may, for example, be safely given an angular displacement of 20° at take-off and landing speeds while at the maximum subsonic indicated speed an angular displacement of as little as 2° or 3° might be sufficient to break the aircraft.

Clearly therefore the displacements imparted by the pilot to his stick in high speed flight are extremely small and difficulty is sometimes experienced due to the oversensitive control system.

With a view to obviating this difficulty, the invention provides, in or for an aircraft, a flying control system embodying a variable gearing between the pilot's stick and a control surface to be operated thereby and means for automatically changing the gearing in response to increase in air speed so that the travel of the stick required to produce unit displacement of the control surface increases as the air speed increases.

Thus the stick may be connected to the input member of a servo mechanism for actuating the control surface by means of a linkage embodying an adjustable fulcrum, a device responsive to changes in air speed being provided for automatically adjusting said fulcrum so that the travel of the stick required to produce unit displacement of the control surface increases as the air speed increases.

The device responsive to changes in air speed may be arranged to adjust said fulcrum through the agency of a hydraulic jack as described in United States patent applications Nos. 407,536 filed February 1, 1954, now U.S. Patent No. 2,783,006, granted February 26, 1927, and 458,334 filed September 27, 1954, now U.S. Patent No. 2,788,185, granted April 9, 1957. Alternatively, as later described, an electric actuator may be used for the purpose.

The device responsive to changes in air speed may be employed solely to change the gear ratio between the stick and the control surface and introduce no variable stiffness in the stick, which is provided with a conventional spring centering device. The gear change provided may be such that the stick force per unit of acceleration imparted to the aircraft in a manoeuvre is constant. The pilot will then require to displace his stick to the same extent, to obtain a given acceleration of the aircraft, over the entire speed range. However, as later explained, it is in some cases undesirable to provide means whereby the stick force per "g" varies at some limiting value or values of air speed or Mach number. Also, the device responsive to changes in air speed may be arranged not only to change the gear ratio but may also act as a feel simulator to impose a resistance to movement of the stick which increases with air speed.

Figure 2:
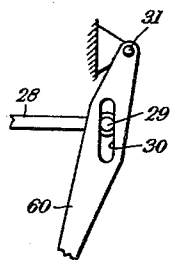
Figure 3:
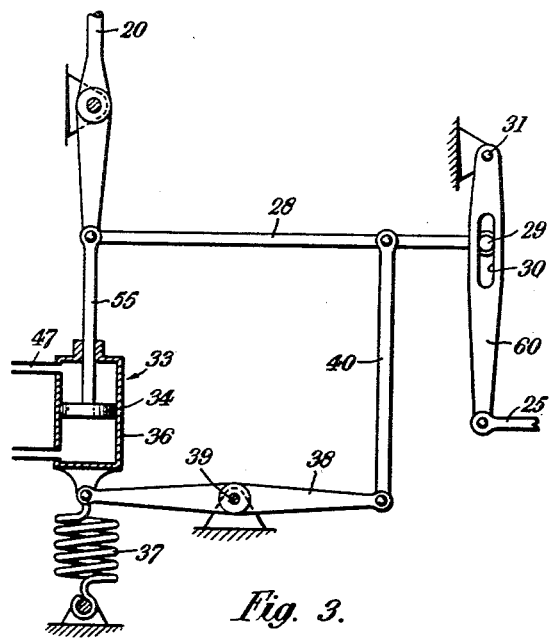
Figure 4:
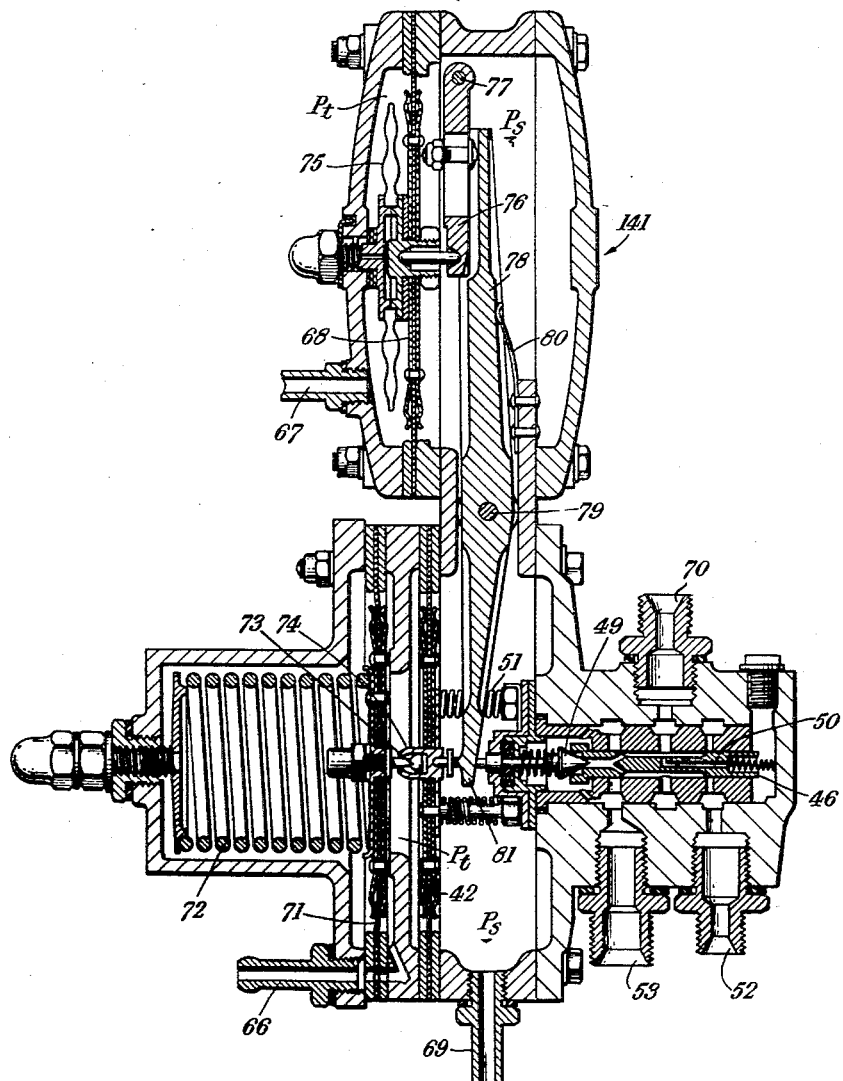

Certain embodiments of the invention will now be described in more detail, by way of example, with reference to the accompanying drawings, in which:

Fig. 1 is a diagrammatic view of a complete flying control system utilising a hydraulic jack to produce a gear change only, Fig. 2 is a detail view showing a modification of the system of Fig. 1, Fig. 3 is a diagrammatic view of part of a system, similar to that of Fig. 1 but with the hydraulic jack arranged to act also as a feel simulator, and Fig. 4 is a vertical section through an alternative form of air speed responsive device for use in conjunction with the systems shown in Figs. 1 and 3.

Like reference numerals indicate like parts throughout the figures.

In the system shown in Fig. 1, the stick 20, which is provided with centering springs 21, is connected by a mechanical linkage to a link 25 connected to the input member of a hydraulic jack 22 for actuating a control surface 23. The jack 22 is of conventional type and includes a control valve movable in opposite directions from a neutral position by a rod 24 to establish alternative pressure and exhaust connections to opposite ends of the jack cylinder and thereby to cause corresponding movement, in one direction or the other, of the jack piston, the rod 26 of which is connected to the control surface and also, by means of the usual follow-up link 27, to the rod 24 and to the link 25. The mechanical linkage comprises a link 28, carrying a pin 29 engaging a slot 30 in a lever 60, pivoted at one end at a fixed point 31 and pivoted at the other end 32 to the link 25. The gear change is effected by changing the position of the pin 29 in the slot 30, as will now be described.

The position of the pin 29 in the slot 30 is controlled by a hydraulic jack 33, the piston 34 of which is anchored at a fixed point 35 and the cylinder 36 of which is connected to the aircraft structure by a stiff spring 37 and is also pivoted to a lever 38. The lever 38 is mounted on a fixed pivot 39 and is connected by a link 40 to the link 28.

The hydraulic pressure in the cylinder 36 is caused to increase as the airspeed increases by an air speed responsive unit 41 of the kind described in United States application No. 407,536/54. This includes a diaphragm 42, subject from a Pitot head 43, through pipes 44, 45, to total or ram pressure $P_t$ at its upper surface and to static pressure $P_s$ at its undersurface. The unit 41 includes a control valve 46 which serves to determine the hydraulic pressure in a signal line 47 communicating with the cylinder 36. A push rod 48, carrying a valve 49 at its lower end, is interposed between the diaphragm 42 and the control valve 46, which is subject at its undersurface to the signal pressure, which is applied thereto through a duct 50.

Normally, the control valve 46 occupies the neutral position shown, the signal pressure on its undersurface assisted by the pressure of a spring 51, balancing the pressure differential across the diaphragm 42. If the air speed increases, the control valve 46 will be depressed, so connecting the signal line 47 to a pressure inlet 52. The signal pressure accordingly increases to a value at which it is sufficient to return the control valve to its neutral position. On decrease in the air speed, the control valve 46 rises, connecting the signal line 47 to an exhaust outlet 53, thus allowing the signal pressure to fall to a value at which the diaphragm 42 is able to return the control valve 46 to its neutral position. The signal pressure is applied through a duct 54 to the undersurface of the valve 49, which opens, as described in United States application No. 407,536/54, to permit of reduction of the signal pressure if, as the result of seizure of the control valve 46, the signal pressure should become excessive.

The pressure in the cylinder 36 thus increases with increase in air speed and so gradually lifts the cylinder against the action of the spring 37, rocking the lever 38 clockwise and causing the pin 29 to move down in the slot 30. The travel of the stick required to produce unit displacement of the control surface thus increases as the air speed increases.

In certain circumstances the system so far described may render the aircraft statically unstable. Thus, in the case of operation of the elevator, the following sequence of operations may occur:

(1) The pilot eases the stick back.
(2) The aircraft noses up.
(3) As soon as the aircraft is climbing, the speed drops.
(4) The unit 41 senses the reduction in speed and reduces the hydraulic pressure in the cylinder 36.
(5) The link 40 moves up to lift the pin 29 in the slot 30. As the lever 60 is at this time in a position inclined to the vertical, the movement of the pin 29 in the slot 30 will impart, without any further stick movement by the pilot, an additional displacement to the elevator.
(6) The aircraft noses up still further, the speed drops still more and the cycle of events continues.

This can be prevented by inclining the slot 30 at an angle to the lengthwise direction of the lever 60 as shown in Fig. 2. Then, when the lever 60 is in the position which it assumes when the stick is eased back, movement of the pin 29 in the slot 30 in response to reduction of the hydraulic pressure in the cylinder 36 will have no effect on the position of the control surface. Accordingly within the limits of the trim range, vertical displacement of the pin 29 will not produce a positive increase in the angular displacement of the elevator in relation to the position of the stick. In the stick forward position, the tendency of the hydraulic pressure in the cylinder 36 is to impart less movement to the elevator in response to increase in speed of the aircraft, but this does not matter as this is a stable and not an unstable condition.

The system shown in Fig. 3 differs from that of Fig. 1 in that the stick 20 is pivoted to the rod 55 of the piston 34, the centering springs being omitted. The hydraulic jack 33 thus serves not only to provide the gear change, by shifting the pin 29 in the slot 30, but also as a feel simulator, providing, as in the case of United States application No. 407,536, a resistance to movement of the stick which increases with increase in air speed.

In the arrangements so far described, the adjustable fulcrum in the linkage between the stick and the input member of the jack for actuating the control surface will continue to be adjusted progressively as the air speed increases. It will be understood, however, that the relationship between air pressure and the signal pressure communicated to cylinder 36 of the jack 33 in Figs. 1 and 3 may be made non-linear by utilizing any of the expedients described in United States applications Nos. 407,536/54 and 458,334/54. Thus, by the provision of a stop to arrest continued movement of the diaphragm 42 we may arrange that there will be no further gear change after the air speed has increased beyond a given limit. Again, we can arrange for a second pressure sensitive device to become operative, at a given air speed or Mach number, to exert a force on the control valve 46 in opposition to that exerted by the diaphragm 42, this force increasing as the air speed increases. One such arrangement is shown in Fig. 4.

The air speed responsive unit 141 shown in Fig. 4 is generally similar to the unit 41 shown in Fig. 1, the diaphragm 42 operating on the control valve 46 below a given air speed to control the signal pressure as already described. In Fig. 4, 66 represents the total pressure connection to the diaphragm 42, 67 another total pressure connection to a diaphragm 68 described later, 69 the static pressure connection to the unit and 70 the outlet to the signal line.

A diaphragm 71 is also exposed to the pressure differential $P_i - P_s$, which acts in the direction to move the diaphragm 71 away from the diaphragm 42, and is balanced against this pressure differential by a spring 72. The diaphragm 71 carries a stud 73 moving with clearance in a claw 74 fixed to the diaphragm 42. When the afore-said given air speed is attained, the lost motion between the stud 73 and the claw 74 is taken up and on further increase in the air speed the diaphragm 71 will oppose the diaphragm 42. If the areas of the diaphragms 42, 71 are equal, the signal pressure will remain constant, on further increase in the air speed, at the value which it attains when the given air speed is attained. If the diaphragm 71 is smaller than the diaphragm 42, the signal pressure will continue to increase with air speed but at a slower rate. If the diaphragm 71 is larger than the diaphragm 42, the signal pressure will decrease as the air speed increases beyond the given value.

The diaphragm 68 carries, at the side thereof exposed to total pressure through the connection 67, an evacuated capsule 75. It bears against a rocker 76, pivoted at 77 and bearing in turn against a lever 78 pivoted on a central pivot 79 and held in contact with the rocker 76 by a spring 80. Normally, the free end 81 of the lever 78 is clear of the diaphragm 42. At a predetermined Mach number, however, the diaphragm 68 will have rocked the lever 78 sufficiently to render its end 81 effective to exert a force on the diaphragm 42. Thereafter, the diaphragm 68 will be effective to oppose the diaphragm 42 and so reduce the signal pressure as the Mach number increases. If the capsule 75 is omitted, the diaphragm 68 will render the lever 78 effective on the diaphragm 42 at a given air speed instead of at a given Mach number.

What we claim as our invention and desire to secure by Letters Patent is:

1. A power operated flying control system for aircraft, comprising a control surface, a pilot's control member, a servo mechanism having an input member and an output member, said output member being connected to and serving to actuate the control surface, a linkage connecting the control member to the input member, said linkage including a member which is adjustable to reduce, in response to increase in airspeed, the movement imparted by the linkage to the input member per unit of movement of the control member, a hydraulic jack including a piston member and a housing member, said housing member being movable in response to variations in hydraulic pressure in the housing and being connected to said adjustable linkage member and said piston member being connected to said control member and movable therewith against the resistance offered by the hydraulic pressure in the housing member, a spring opposing movement of said housing member, means responsive to changes in airspeed and means controlled by said responsive device to establish in said housing member a variable hydraulic pressure which increases progressively as the airspeed increases up to a given value at least of airspeed, said housing member moving to adjust the adjustable linkage member in response to changes in said hydraulic pressure.

2. A power operated flying control system for aircraft, comprising a control surface, a pilot's control member, a servo mechanism having an input member and an output member, said output member being connected to and serving to actuate the control surface, a linkage connecting the control member to the input member, said linkage including a member which is adjustable to reduce, in response to increase in airspeed, the movement imparted by the linkage to the input member per unit of movement of the control member, a hydraulic jack including a piston member and a housing member, one of said members being movable in response to variations in hydraulic pressure in the housing member and being connected to said adjustable member, a spring opposing movement of said movable member, a control valve subject to the hydraulic pressure in the housing member and normally closing an outlet from said housing member, said control valve being movable in opposite directions from a normal position to supply liquid under pressure to said housing member and to allow liquid to flow to exhaust from said housing member, a diaphragm exposed to the difference between total pressure and static pressure and arranged to exert on the control valve a force opposing the hydraulic pressure in the housing member, said force increasing with increase in airspeed, said diaphragm controlling said control valve to maintain in the housing member a hydraulic pressure which increases with air speed and said movable member moving in response to change in said hydraulic pressure to adjust said adjustable linkage member, a second diaphragm extending parallel to said diaphragm and also exposed to the difference between total pressure and static pressure and a lost motion connection between the two diaphragms, said second diaphragm being mounted to move away from the other diaphragm in response to increase in airspeed and being effective, when a given airspeed is exceeded, to apply force to the other diaphragm through said lost motion connection.

3. A power operated flying control system for aircraft, comprising a control surface, a pilot's control member, a servo mechanism having an input member and an output member, said output member being connected to and serving to actuate the control surface, a linkage connecting the control member to the input member, said linkage including a member which is adjustable to reduce, in response to increase in airspeed, the movement imparted by the linkage to the input member per unit of movement of the control member, a hydraulic jack including a piston member and a housing member, one of said members being movable in response to variations in hydraulic pressure in the housing member and being connected to said adjustable member, a spring opposing movement of said movable member, a control valve subject to the hydraulic pressure in the housing member and normally closing an outlet from said housing member, said control valve being movable in opposite directions from a normal position to supply liquid under pressure to said housing member and to allow liquid to flow to exhaust from said housing member, a pressure-sensitive device exposed to the difference between total pressure and static pressure and arranged to exert on the control valve a force opposing the hydraulic pressure in the housing member, said force increasing with increase in airspeed, said pressure-sensitive device controlling said control valve to maintain in the housing member a hydraulic pressure which increases with airspeed and said movable member moving in response to change in said hydraulic pressure to adjust said adjustable linkage member, and a normally inoperative device responsive to Mach number arranged, when a predetermined Mach number is attained, to act on the control valve in opposition to the pressure-sensitive device and thereafter to modify the control exerted by the pressure-sensitive device on the hydraulic pressure in the housing member.

4. A power operated flying control system for aircraft, comprising a control surface, a pilot's control member, a servo mechanism having an input member and an output member, said output member being connected to and serving to actuate the control surface, a linkage connecting the control member to the input member, said linkage including a member which is adjustable to reduce, in response to increase in airspeed, the movement imparted by the linkage to the input member per unit of movement of the control member, a hydraulic jack including a piston member and a housing member, one of said members being movable in response to variations in hydraulic pressure in the housing member and being connected to said adjustable member, a spring opposing movement of said movable member, a control valve subject to the hydraulic pressure in the housing member and normally closing an outlet from said housing member, said control valve being movable in opposite directions from a normal position to supply liquid under pressure to said housing member and to allow liquid to flow to exhaust from said housing member, a pressure-sensitive device exposed to the difference between total pressure and static pressure and arranged to exert on the control valve a force opposing the hydraulic pressure in the housing member, said force increasing with increase in airspeed, said pressure-sensitive device controlling said control valve to maintain in the housing member a hydraulic pressure which increases with airspeed and said movable member moving in response to change in said hydraulic pressure to adjust said adjustable linkage member, a normally inoperative device responsive to Mach number, and an intermediately pivoted lever bearing at one end on said responsive device and having its other end normally spaced from the pressure-sensitive device, said lever moving, when a predetermined Mach number is attained, into contact with the pressure-sensitive device to permit the responsive device to apply to the pressure-sensitive device a force opposing the air pressure acting thereon.

References Cited in the file of this patent

UNITED STATES PATENTS

| | | |
|---|---|---|
| 1,896,999 | Bertram | Feb. 7, 1933 |
| 2,205,610 | Van Nes | June 25, 1940 |
| 2,342,184 | Fawcett | Feb. 22, 1944 |
| 2,395,671 | Kleinhans et al. | Feb. 26, 1946 |
| 2,548,481 | Knowler et al. | Apr. 10, 1951 |
| 2,652,994 | Feeney | Sept. 22, 1953 |

FOREIGN PATENTS

| | | |
|---|---|---|
| 339,399 | Italy | Apr. 18, 1936 |
| 1,098,262 | France | Mar. 2, 1955 |